(12) United States Patent
Beggins et al.

(10) Patent No.: US 7,523,066 B2
(45) Date of Patent: Apr. 21, 2009

(54) APPARATUS AND METHOD FOR FACILITATING COMMUNICATION FOR BORROWERS AND INVESTORS REGARDING COMMERCIAL MORTGAGES

(75) Inventors: Joseph F. Beggins, Houston, TX (US); Peter A. Blake, Bellaire, TX (US); Nedra J. Buchanan, Houston, TX (US)

(73) Assignee: General Electric Captical Corporation, Stamford, CT (US)

( * ) Notice: Subject to any disclaimer, the term of this patent is extended or adjusted under 35 U.S.C. 154(b) by 1449 days.

(21) Appl. No.: 10/022,075

(22) Filed: Dec. 18, 2001

(65) Prior Publication Data

US 2003/0018575 A1    Jan. 23, 2003

Related U.S. Application Data

(60) Provisional application No. 60/307,031, filed on Jul. 20, 2001.

(51) Int. Cl.
*G06Q 40/00*    (2006.01)
(52) U.S. Cl. .............................. 705/38; 705/37; 705/36; 705/35
(58) Field of Classification Search .................. 705/37, 705/38, 35, 43, 40, 36
See application file for complete search history.

(56) References Cited

U.S. PATENT DOCUMENTS

| | | | | |
|---|---|---|---|---|
| 5,892,900 | A * | 4/1999 | Ginter et al. .................. | 726/26 |
| 6,292,788 | B1 * | 9/2001 | Roberts et al. ............. | 705/36 T |
| 6,304,860 | B1 * | 10/2001 | Martin et al. .................. | 705/43 |
| 6,393,415 | B1 * | 5/2002 | Getchius et al. ................. | 707/2 |
| 6,615,187 | B1 * | 9/2003 | Ashenmil et al. ......... | 705/36 R |
| 6,938,008 | B1 * | 8/2005 | Stokes .......................... | 705/35 |

OTHER PUBLICATIONS

In commercial projects, lending again personal, Linding Wei. Chicago Tribune. Chicago, Ill.: Jul. 20, 2008. p. 11.*
Wheeler, Darrell, Salomon Smith Barney: "A Guide to Commercial Mortgage-Backed Securities" (Jan. 2001) 50 pages.
An Investor's Guide to: "Pass~Through and Collateralized Mortgage Securities, Long-term income paid monthly, quarterly or semiannually"—12 pages.
Commercial Mortgage-Backed Securities Terminology—26 pages.
Midland News: "Midland Unveils Web-Based CMBS Investor Reporting System" http://www.midlandls.com/web/mlsweb.nsf/4bc2b6e2caff657e86256a8f005403cc/86256af (download Nov. 9, 2001) 1 page.
What are Mortgage Securities? http://www.investinginbonds.com/info/igmbs/what.htm (download Oct. 25, 2001) 1 page.
aba.com, Products: "ABA Routing Numbers" http://www.aba.com/Products/PS98_Routing.htm (download Nov. 7, 2001) p. 1 and 2.
Nacha: "What is ACH?" http://www.nacha.org/About/what_is_ach_.htm (download Nov. 7, 2001) p. 1 of 2.

* cited by examiner

*Primary Examiner*—Frantzy Poinvil
*Assistant Examiner*—Clement Graham
(74) *Attorney, Agent, or Firm*—Buckley, Maschoff & Talwalkar LLC

(57) ABSTRACT

A system, method, apparatus, means, and computer program code that facilitate communication between trustees, investors, borrowers, and other vendors associated with a commercial mortgage loan.

28 Claims, 10 Drawing Sheets

← 400

| ACCOUNT IDENTIFER 402 | ASSOCIATED PROPERTY IDENTIFIERS 404 | ASSOCIATED BORROWER IDENTIFIERS 406 | ASSOCIATED INVESTOR IDENTIFIERS 408 |
|---|---|---|---|
| A-1256 | P-82378 | B-815391 | I-39105<br>I-40028<br>I-80191 |
| A-3019 | P-47530 | B-510671 | I-68327 |
| A-6481 | P-12813 | B-451859 | I-80191 |
| A-7394 | P-47530 | B-815391 | I-40028 |

| CURRENT ACCOUNT BALANCE 410 | NEXT PAYMENT DUE FROM BORROWER FOR ACCOUNT 412 | RESERVE AMOUNT 414 |
|---|---|---|
| $28,000,000 | $300,000 DUE BY FEBRUARY 25, 2002 | $2,500,000 |
| $150,000,000 | $5,000,000 DUE BY JANUARY 26, 2002 | NONE |
| $77,000,000 | NO PAYMENTS DUE FOR NEXT THREE MONTHS | $1,750,000 |
| $123,000,000 | $15,000 DUE BY DECEMBER 15, 2001 | $10,000,000 |

FIG. 7

| BORROWER IDENTIFER 502 | BORROWER NAME 504 | LOGIN/PASSWORD 506 | ACCOUNT IDENTIFIERS 508 |
|---|---|---|---|
| B-451859 | BIGCO PROPERTY DEVELOPERS | BPD/AXF149011 | A-6481 |
| B-510671 | INDUSTRIAL DEVELOPMENT, INC. | IDINC/G94301971 | A-3019 |
| B-815391 | CARTER SHOPPING DEVELOPMENT | CARTER/LPJ71VNN2 | A-1256<br>A-7394 |

APPARATUS AND METHOD FOR FACILITATING COMMUNICATION FOR BORROWERS AND INVESTORS REGARDING COMMERCIAL MORTGAGES

CROSS-REFERENCE TO RELATED APPLICATION

This application is based on a provisional patent application filed Jul. 20, 2001, having Application Ser. No. 60/307,031 and entitled Commercial Real Estate Buyer Information System and Method, the contents of all of which are herein incorporated by reference.

FIELD OF THE INVENTION

The present invention relates to a method and apparatus for facilitating communication for borrowers and investors and, more particularly, embodiments of the present invention relate to methods, means, apparatus, and computer program code for facilitating communication and payments for and among borrowers and investors regarding commercial mortgage backed securities and related properties and commercial mortgage loan accounts.

BACKGROUND OF THE INVENTION

Commercial mortgage backed securities provide an ownership interest in commercial mortgage loans made by banks, savings & loans, mortgage companies or other financial institutions regarding one or properties or other real estate (e.g., apartment complex, shopping center). It is not unusual for a commercial mortgage loan may be in excess of tens of millions or even hundreds of millions of dollars.

Mortgage backed securities are created when mortgage loans are pooled by issuers of the securities who sell the securities to investors. An investor may purchase a mortgage backed security when the security is first offered or later when the security is sold in a secondary market. Often, a government agency (e.g., Government National Mortgage Association, Federal Home Loan Mortgage Association) or a private institution will pool the mortgage and issued the securities.

For purposes of management of a commercial mortgage loan, reporting to investors, providing services to a borrower, etc., an entity known as a "master servicer" may be engaged. Responsibilities of a master servicer for different mortgage loan accounts may vary according to different servicing and/or pooling agreements and may include one or more of the following: conducting property inspections of properties involved in mortgages to borrowers; working with special servicers to transfer loans that are in default, become non-performing or meet other specific conditions; creating and providing statements and reports (e.g., property reports, periodic reports, supplemental reports) to trustees and other investors; collecting mortgage payments from borrowers, delivering payments to trustees or other investors; advancing late payments due from borrowers to trustees or other investors; maintaining reserve and escrow funds on behalf of trustees and other investors to be paid to borrowers; paying property taxes and monitoring insurance coverage; etc. The master servicer may communicate with borrowers, investors, trustees, and other parties as part of its responsibilities.

A trustee is a type of investor and typically holds mortgage collateral documents, issues securities or certificates of beneficial ownership, passes payments or funds received from the master servicer to certificate holders (e.g., investors), distributes statements and reports received from the master servicer, consults with and perhaps supervises the master servicer in accordance with any servicing or pooling agreement established with the master servicer, and may have the power to appoint a new master servicer. A trustee may hold legal title to any property or other collateral (e.g., mortgages) involved in a commercial mortgage on behalf of other investors.

An investor is an owner of record of a security or certificate that defines or describes beneficial ownership or other rights in a trust managed by a trustee. Thus, a trustee manages the trust on behalf of investors while the investors are the beneficial owners of the trust. A trustee may own the rights to commercial mortgages and receive payments from the master servicer that the master servicer has received from a borrower. An investor may be or include a party actually purchasing a commercial mortgage backed security or a party (e.g., property inspector, accountant, clerk) associated with the investor.

Many companies exist that act as master servicers (e.g., Midland Loan Services, Inc., CapMark Services, ORIX Real Estate Capital Markets, Prudential Asset Resources). In addition, several of these companies operate World Wide Web ("Web") sites (e.g., www.midlandls.com) that provide information and resources to investors regarding commercial mortgage backed securities. It would be advantageous to provide a method and apparatus that overcame the drawbacks of the prior art. In particular, it would be desirable to provide a method and apparatus of providing services to borrowers involved in commercial mortgages as well as providing more integrated support for both borrowers and investors.

SUMMARY OF THE INVENTION

Embodiments of the present invention provide a system, method, apparatus, means, and computer program code for facilitating communication for borrowers and investors regarding commercial mortgages. An entity will be able to provide referrals for borrowers, provide responses to inquiries received from investors, and process payments on behalf of borrowers.

Additional objects, advantages, and novel features of the invention shall be set forth in part in the description that follows, and in part will become apparent to those skilled in the art upon examination of the following or may be learned by the practice of the invention.

According to embodiments of the present invention, a method for facilitating payment by a borrower having an account involving a commercial mortgage loan, wherein ownership interest in the commercial mortgage loan is provided via at least one commercial mortgage backed security may include allowing access by a borrower to an electronically accessible resource, wherein the electronically accessible resource includes information regarding a commercial mortgage loan account; determining a payment due from the borrower within a time period, wherein the payment is associated with the account; providing a notification via a first electronic communication to the borrower regarding the payment; receiving authorization from the borrower via a second electronic communication to process the payment; and processing the payment. In another embodiment, a method for facilitating referral by a borrower to a vendor, wherein the borrower has an account involving a commercial mortgage loan and ownership interest in the commercial mortgage loan is provided via at least one commercial mortgage backed security may include allowing access by a borrower to an electronically accessible resource, wherein the electronically accessible resource includes information regarding a commercial mortgage loan account; receiving a request via the electronically accessible resource from the borrower for a service, wherein the borrower is associated with the account; identifying a vendor that can provide the service; identifying at least one step associated with the request; providing a notification via an electronic communication to the vendor regarding the request and the at least one step; and communicating with the vendor regarding the at least one step. In a further embodiment, a method for facilitating response to an inquiry from an investor regarding a commercial mortgage loan, wherein ownership interest in the commercial mortgage loan is provided to at least one investor via at least one commercial mortgage backed security may include allowing access by an investor to an electronically accessible resource, wherein the electronically accessible resource includes information regarding a commercial mortgage loan; receiving an inquiry via the electronically accessible resource from the investor regarding the commercial mortgage loan; determining at least one other investor associated with the commercial mortgage loan; determining a response to the inquiry; and providing the response to the investor and the at least one other investor.

According to embodiments of the present invention, a system for facilitating payment by a borrower having an account involving a commercial mortgage loan, wherein ownership interest in the commercial mortgage loan is provided via at least one commercial mortgage backed security may include a memory; a communication port; and a processor connected to the memory and the communication port, the processor being operative to allow access by a borrower to an electronically accessible resource, wherein the electronically accessible resource includes information regarding a commercial mortgage loan account; determine a payment due from the borrower within a time period, wherein the payment is associated with the account; provide a notification via a first electronic communication to the borrower regarding the payment; receive authorization from the borrower via a second electronic communication to process the payment; and process the payment. In another embodiment, a system for facilitating referral by a borrower to a vendor, wherein the borrower has an account involving a commercial mortgage loan and ownership interest in the commercial mortgage loan is provided via at least one commercial mortgage backed security may include a memory; a communication port; and a processor connected to the memory and the communication port, the processor being operative to allow access by a borrower to an electronically accessible resource, wherein the electronically accessible resource includes information regarding a commercial mortgage loan account; receive a request via the electronically accessible resource from the borrower for a service, wherein the borrower is associated with the account; identifying a vendor that can provide the service; identify at least one step associated with the request; provide a notification via an electronic communication to the vendor regarding the request and the at least one step; and communicate with the vendor regarding the at least one step. In a further embodiment, a system for facilitating response to an inquiry from an investor regarding a commercial mortgage loan, wherein ownership interest in the commercial mortgage loan is provided to at least one investor via at least one commercial mortgage backed security may include a memory; a communication port; and a processor connected to the memory and the communication port, the processor being operative to allow access by an investor to an electronically accessible resource, wherein the electronically accessible resource includes information regarding a commercial mortgage loan; receive an inquiry via the electronically accessible resource from the investor regarding the commercial mortgage loan; determine at least one other investor associated with the commercial mortgage loan; determine a response to the inquiry; and provide the response to the investor and the at least one other investor.

According to embodiments of the present invention, a computer program product in a computer readable medium for facilitating payment by a borrower having an account involving a commercial mortgage loan, wherein ownership interest in the commercial mortgage loan is provided via at least one commercial mortgage backed security, may include first instructions for facilitating access by a borrower to an electronically accessible resource, wherein the electronically accessible resource includes information regarding a commercial mortgage loan account; second instructions for identifying a payment due from the borrower within a time period, wherein the payment is associated with the account; third instructions for sending a notification via a first electronic communication to the borrower regarding the payment; fourth instructions for obtaining authorization from the borrower via a second electronic communication to process the payment; and fifth instructions for making the payment. In another embodiment, a computer program product in a computer readable medium for facilitating referral by a borrower to a vendor, wherein the borrower has an account involving a commercial mortgage loan and ownership interest in the commercial mortgage loan is provided via at least one commercial mortgage backed security may include first instructions for facilitating access by a borrower to an electronically accessible resource, wherein the electronically accessible resource includes information regarding a commercial mortgage loan account; second instructions for obtaining a request via the electronically accessible resource from the borrower for a service, wherein the borrower is associated with the account; third instructions for selecting a vendor that can provide the service; fourth instructions for selecting at least one step associated with the request; fifth instructions for sending a notification via an electronic communication to the vendor regarding the request and the at least one step; and sixth instructions for maintaining contact with the vendor regarding the at least one step. In a further embodiment, a computer program product in a computer readable medium for facilitating response to an inquiry from an investor regarding a commercial mortgage loan, wherein ownership interest in the commercial mortgage loan is provided to at least one investor via at least one commercial mortgage backed security may include first instructions for facilitating access by an investor to an electronically accessible resource, wherein the electronically accessible resource includes information regarding a commercial mortgage loan; second instructions for obtaining an inquiry via the electronically accessible resource from the investor regarding the commercial mortgage loan; third instructions for identifying at least one other investor associated with the commercial mortgage loan; fourth instructions for identifying a response to the inquiry; and fifth instructions for sending the response to the investor and the at least one other investor.

According to embodiments of the present invention, an apparatus for facilitating payment by a borrower having an account involving a commercial mortgage loan, wherein ownership interest in the commercial mortgage loan is provided via at least one commercial mortgage backed security, may include means for facilitating access by a borrower to an electronically accessible resource, wherein the electronically accessible resource includes information regarding a commercial mortgage loan account; means for identifying a payment due from the borrower within a time period, wherein the payment is associated with the account; means for sending a notification via a first electronic communication to the borrower regarding the payment; means for obtaining authorization from the borrower via a second electronic communication to process the payment; and means for making the payment. In another embodiment, an apparatus for facilitating referral by a borrower to a vendor, wherein the borrower has an account involving a commercial mortgage loan and ownership interest in the commercial mortgage loan is provided via at least one commercial mortgage backed security may include means for facilitating access by a borrower to an electronically accessible resource, wherein the electronically accessible resource includes information regarding a commercial mortgage loan account; means for obtaining a request via the electronically accessible resource from the borrower for a service, wherein the borrower is associated with the account; means for selecting a vendor that can provide the service; means for selecting at least one step associated with the request; means for sending a notification via an electronic communication to the vendor regarding the request and the at least one step; and means for maintaining contact with the vendor regarding the at least one step. In a further embodiment, an apparatus for facilitating response to an inquiry from an investor regarding a commercial mortgage loan, wherein ownership interest in the commercial mortgage loan is provided to at least one investor via at least one commercial mortgage backed security may include means for facilitating access by an investor to an electronically accessible resource, wherein the electronically accessible resource includes information regarding a commercial mortgage loan; means for obtaining an inquiry via the electronically accessible resource from the investor regarding the commercial mortgage loan; means for identifying at least one other investor associated with the commercial mortgage loan; means for identifying a response to the inquiry; and means for sending the response to the investor and the at least one other investor.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention.

FIG. 7 is an illustration of a representative account information database of FIG. 6;

FIG. 8 is an illustration of a representative borrower information database of FIG. 6;

DETAILED DESCRIPTION

Applicants have recognized that there is a need for systems, means, computer code and methods that facilitate communication between trustees, investors, borrowers, and other parties associated with a commercial mortgage loan. In particular, applicants have recognized that there is a need for systems, means, computer code and methods for allowing payments to be processed for borrowers by an account servicer, for allowing investors to receive responses to inquiries regarding commercial mortgage loans, and for referring borrowers to vendors for services requested by the borrowers. A technical effect obtained by such systems, methods, etc. is that information regarding commercial mortgage loan is made available to a wider group of people in an efficient and effective manner. These and other features will be discussed in further detail below, by describing a system, individual devices, and processes according to embodiments of the invention.

System

Figure 1:
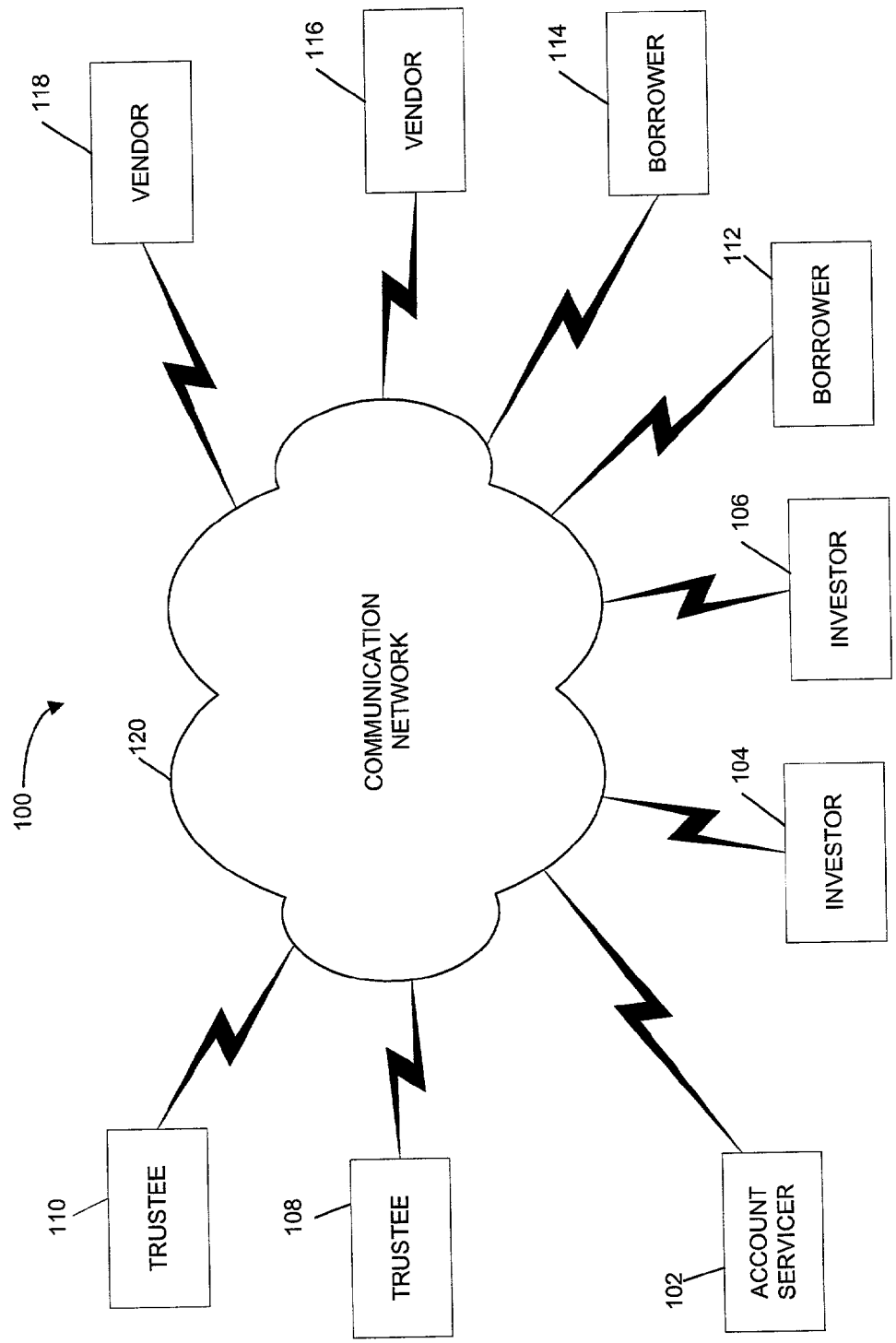
FIG. 1 is a block diagram of system components for an embodiment of an apparatus in accordance with the present invention.

Now referring to FIG. 1, an apparatus or system 100 usable with the methods disclosed herein is illustrated. The system 100 includes an account servicer 102 which may be in communication with one or more investors 104, 106 (which may be or include one or more trustees 108, 110) one or more borrowers 112, 114, one or more vendors 116, 118, and perhaps one or more other entities, devices or parties via a computer, data or other communications network 120. The system 100 is particularly useful as a communication vehicle between parties involved in commercial mortgage backed securities and commercial mortgage loans.

In some embodiments, the account service 102 may be a "master servicer" or assume some or all of the role of a master service, whereby the account servicer 102 provides service to investors and borrowers regarding mortgage loans collateralized via a commercial mortgage backed security. Each commercial mortgage loan may have an associated account that is managed by the account servicer 102. In some embodiments, information regarding one or more accounts may be stored or found in an account information database.

Responsibilities of the account servicer 102 for different investors or borrowers may vary according to different servicing and/or pooling agreements and may include one or more of the following: conducting property inspections of properties involved in mortgages to borrowers; working with special servicers to transfer loans that are in default, become non-performing or meet other specific conditions; creating and providing statements and reports (e.g., property reports, periodic reports, supplemental reports) to trustees and other investors; collecting mortgage payments from borrowers, delivering payments to trustees or other investors; advancing late payments due from borrowers to trustees or other investors; maintaining reserve and escrow finds on behalf of trustees and other investors to be paid to borrowers; paying property taxes and monitoring insurance; etc.

In some embodiments, the account servicer 102 may answer inquiries received from investors, provide referrals for borrowers, and process payments for borrowers, as will be discussed in more detail below. In some embodiments, the account service 102 also may perform some or all of the duties of a "special servicer" for commercial mortgages.

The account service 102 may communicate directly or indirectly with the investors 104 and 106, borrowers 112 and 114, trustees 108 and 110, and vendors 116 and 118. In some embodiments, other borrowers, investors, etc. may communicate directly or indirectly with the account service 102 and/or each other.

The account service 102 may include, use or comprise a single device or computer, a networked set or group of devices or computers, a workstation, etc. In some embodiments, the account servicer 102 may implement or host a Web site, database, or other electronically accessible resource for purposes of implementing the methods described herein and for providing information to investors, borrowers, etc.

A trustee is a type of investor and typically holds mortgage collateral documents, issues securities or certificates of beneficial ownership, passes payments or funds received from the account servicer 102 to certificate holders (e.g., investors), distributes statements and reports received from the account servicer 102, consults with and perhaps supervises the account servicer 102 in accordance with any servicing or pooling agreement established with the account service 102, and may have the power to appoint a new account servicer. A trustee may hold legal title to any property or other collateral (e.g., mortgages) involved in a commercial mortgage on behalf of other investors. In some embodiments, information regarding one or more trustees and/or investors may be stored or found in an investor information database.

An investor is an owner of record of a security or certificate that defines or describes beneficial ownership or other rights in a trust managed by a trustee. Thus, a trustee manages the trust on behalf of investors while the investors are the beneficial owners of the trust. A trustee may own the rights to commercial mortgages and receive payments from the account servicer 102 that the account servicer 102 has received from a borrower. The account service 102 acts as the conduit or communication channel between the trustee and the borrower while the trustee as a conduit or communication channel between the account servicer 102 and one or more investors. An investor may be or include a party actually purchasing a commercial mortgage backed security or a party (e.g., property inspector, broker, accountant, clerk) associated with the investor. In some embodiments, information regarding one or more investors may be stored or found in an investor information database.

A vendor may be any service provider or other party that may be of interest or need to the account servicer 102 or a borrower, trustee or investor. For example, potential vendors may include accounting firms, law firms, property inspectors, property appraisers, banks or other financial institutions, etc. In some embodiments, the system 100 may not include any vendors. In some embodiments, information (e.g., name, specialty, contact information, identifier) regarding one or more vendors may be stored or found in a vendor information database.

A borrower may be a company, individual or other entity that takes out a commercial mortgage or otherwise receives a commercial loan collateralized by a commercial property. It is not unusual for commercial mortgages to be in the tens of millions of dollars or more. A borrower may be or include the party actually borrowing the money or receiving the commercial loan or a party (e.g., property manager, accountant, clerk) associated with the borrower. In some embodiments, information regarding one or more borrowers may be stored or found in a borrower information database.

Investors, borrowers, trustees and vendors may use different devices to communicate with each other and/or the account service 102. Possible devices include a personal computer, server, portable computer, mobile or fixed user station, workstation, network terminal or server, cellular telephone, kiosk, dumb terminal, personal digital assistant, etc.

Many different types of implementations or hardware configurations can be used in the system 100 and with the methods disclosed herein and the methods disclosed herein are not limited to any specific hardware configuration for the system 100 or any of its components. The communications network 120 might be or include the Internet, the World Wide Web, or some other public or private computer, cable, telephone, client/server, peer-to-peer, or communications network or intranet, as will be described in further detail below. The communications network 120 illustrated in FIG. 1 is meant only to be generally representative of a cable, computer, telephone, peer-to-peer, Automated Clearing House (ACH) network, and/or other communication network for purposes of elaboration and explanation of the present invention and other devices, entities, networks, etc. may be connected to the communications network 120 without departing from the scope of the present invention. The communications network 120 also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc.

In some embodiments, a borrower or investor user device may be connected directly to the account servicer 102 without departing from the scope of the present invention. Moreover, as used herein, communications include those enabled by wired or wireless technology. The devices or parties shown in FIG. 1 need not be in constant communication. For example, the borrower 114 may communicate with the account servicer 102 only when such communication is appropriate or necessary.

Figure 2:
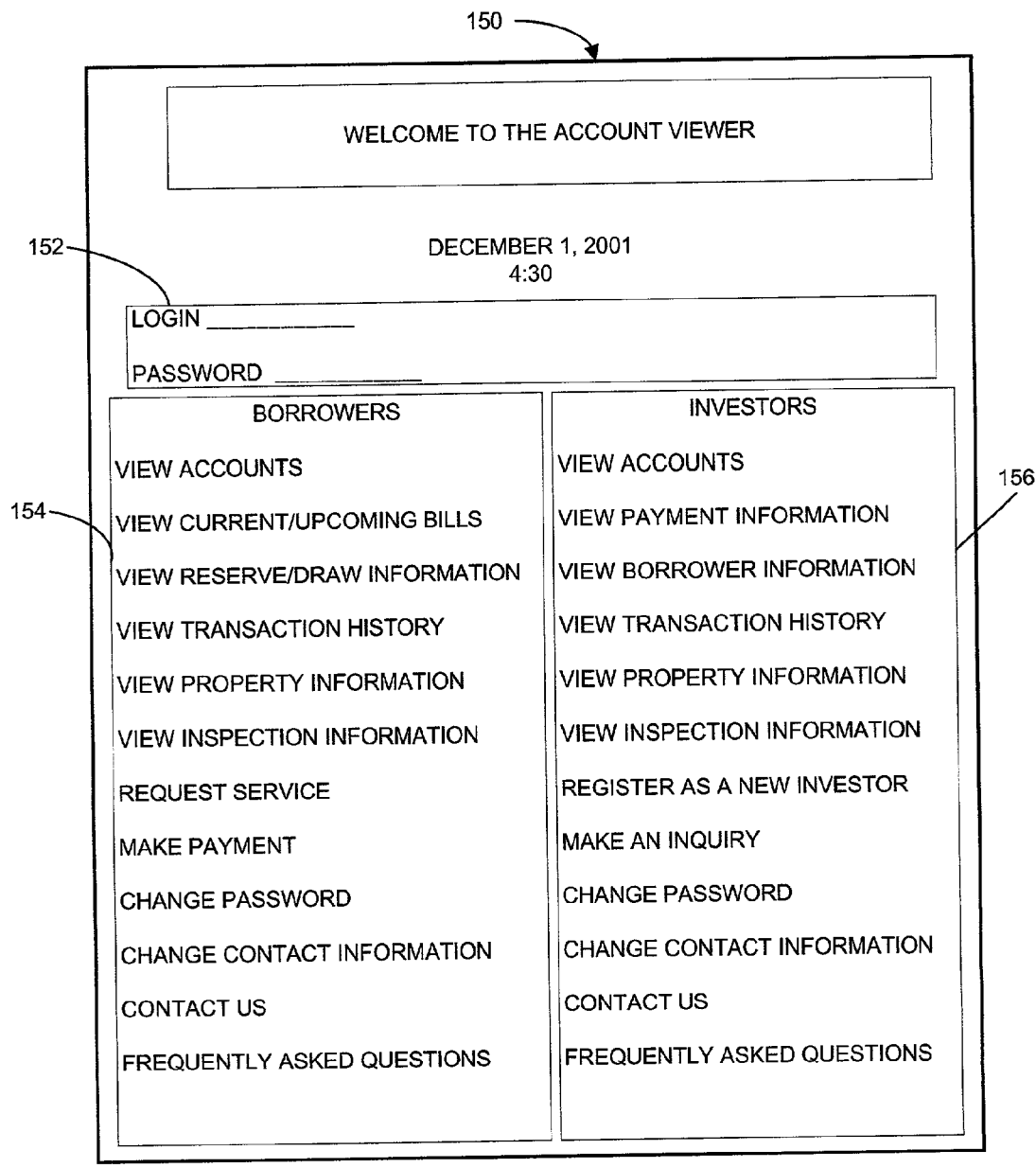
FIG. 2 is a representative view page or window displayed by the account servicer of FIG. 1.

Now referring to FIG. 2, one representation of a potential interface 150 to an electronically accessible resource that may be provided or facilitated by the account servicer 102 is illustrated. As previously discussed above, in some embodiments the account servicer 102 may host, implement, operate or otherwise provide a Web site that may be accessed and used by investors, trustees, borrowers, etc. to monitor the status of commercial mortgage accounts, to communicate with the account servicer 102 or other parties, to find information regarding accounts or properties, etc.

The Web site or other electronically available resource provided by the account servicer 102 may allow borrowers and investors to check the status of accounts, download or receive statements or reports, check or view reserve or escrow account information, provide requests for draws on reserve accounts, check bills and payments due, see lists of associated accounts, view a record or history of transactions associated with accounts, make or provide inquiries, request a referral to vendors for specific services, view information (e.g., property inspection results) regarding properties associated with accounts, view general information regarding commercial mortgages or commercial mortgage backed securities, view information regarding the account servicer 102, etc.

The interface 150 may be a conventional Web or HTML page or form displayed via browser software and served from one or more Web site servers. Different actions or features may be accessible to different parties when the parties access or receive the interface 150. For example, a borrower accessing the interface 150 may first have to provide a login and/or password via a security form 152 before the actions and features accessible via a form or frame 154 are displayed to the borrower. The borrower may never access or see the actions and features displayed via a form or frame 156 since they may be accessible only to investors. Similarly, investors may not be able to see or access the actions and features displayed via the form or frame 154 since they may accessible only to borrowers.

The borrower may be able to conduct many activities via the interface 150 and the form or frame 154. For example, each of the items (e.g., "VIEW ACCOUNTS", "VIEW CURRENT/UPCOMING BILLS") in the form or frame 154 may be a hyperlink that leads to another Web site or Web page containing some or all of the relevant information associated with the items. The borrower may be able to click on or otherwise select one or more of the hyperlinks depending on the interests of the borrower. For example, when a borrower clicks or selects "VIEW ACCOUNTS", the borrower may see a list of all of commercial mortgage loan accounts associated with the borrower and other information regarding the accounts. Each item in the list of the accounts may itself be a hyperlink that provides further information or leads to an additional window, Web site or Web page when selected or clicked by the borrower that displays such information.

An investor may be able to conduct many activities via the interface 150 and the form or frame 156. For example, each of the items (e.g., "VIEW ACCOUNTS", "VIEW BORROWER INFORMATION", "MAKE AN INQUIRY") in the form or frame 156 may be a hyperlink that leads to another Web site or Web page containing some or all of the relevant information associated with the items.

Process Description

Figure 3:
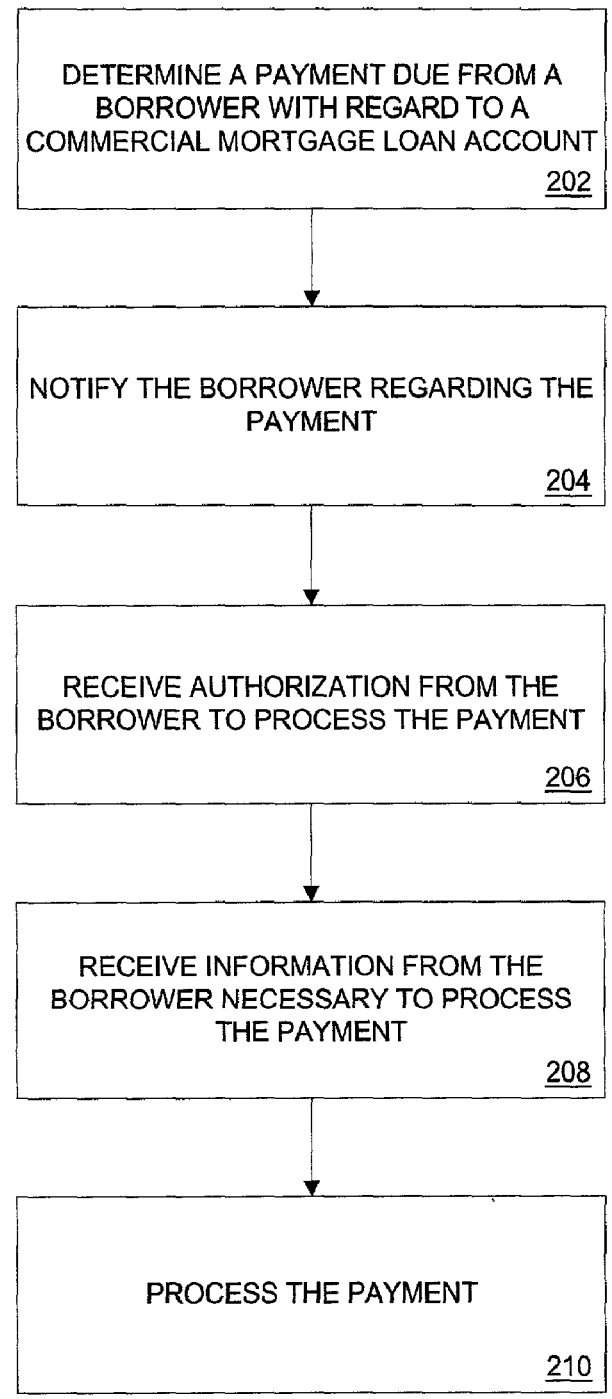
FIG. 3 is a flowchart of a first embodiment of a method usable with the system of FIG. 1.

Reference is now made to FIG. 3, where a flow chart 200 is shown which represents the operation of a first embodiment of the present invention. The particular arrangement of elements in the flow chart 200 is not meant to imply a fixed order to the steps; embodiments of the present invention can be practiced in any order that is practicable. In some embodiments, some or all of the steps of the method 200 may be performed or completed by the account servicer 102, or a server, user device and/or another device, as will be discussed in more detail below. In some embodiments, the method 200 may be implemented in conjunction with one or more other methods disclosed herein.

The method 200 is particularly useful for allowing the account servicer 102 to process payments or pay bills for or on behalf of one or more borrowers involved in a commercial mortgage loan. A borrower may need to make a payment for a variety of reasons. For example, a borrower may need to make a payment to a master servicer for principal, interest, insurance tax escrow, and reserve payments.

The account servicer 102 may operate or implement a Web site, database, or other electronically accessible resource in or at which information regarding accounts, borrowers, investors, properties, etc. is located. A borrower or an investor may be able to access or retrieve information regarding one or more accounts via the Web site, database, or other electronically accessible resource.

By reminding borrowers of upcoming payments and enabling the borrowers to make payments more easily, the account servicer 102 provides a direct benefit to the borrowers. In addition, the account servicer 102 is more likely to be able to make payments to trustees and other investors or parties on time and without having to advance funds if the borrower pays the account service 102 in advance. Moreover, the account servicer 102 may make interest or other money from floating the payment from the borrower to the account servicer 102 prior to the account servicer 102 making payments to trustees, investors, or other parties using the payments from the borrower.

Processing begins at a step 202 during which a current or expected payment due from a borrower is determined with regard to a commercial mortgage loan account. The payment may be a mortgage payment, a payment to a vendor for services rendered by the vendor, an interest payment, principal payment or other escrow payment like taxes, insurance or reserves, etc. The step 202 or the method 200 may include identifying a due date associated with the payment.

During a step 204, the account servicer 102 provides a notification to the borrower regarding the payment. In some embodiments, such a notification may be sent or otherwise provided to the borrower in or as part of an email message, instant message communication, wireless signal, radio transmission, or other electronic signal or communication. Alternatively, in some embodiments, the borrower may access a Web site or other electronically accessible resource to obtain information regarding upcoming or due payments. The borrower may request information by accessing the Web site and requesting information regarding the payments, such as via the interface 150 and the "VIEW CURRENT/UPCOMING BILLS" in the form or frame 154.

In some embodiments, information provided to the borrower during the step 204 may include one or more of the following: data (e.g., hyperlink, URL) indicative of a location where information regarding the payment or the borrower's account can be located; an identifier of the borrower; an identifier of the account; an indication of the amount due; a due date associated with the payment; an identifier of a recipient of the payment; etc.

In some embodiments, a due date may be associated with the payment identified during the step 202. The step 204 may be implemented prior (e.g., ten days, one month) to such due date so as to give the borrower plenty of time to authorize payment. Similarly, in some embodiments a drop date may be associated with the payment identified during the step 202. The method 200 may include determining such a drop date. A drop date may include a date on which a bill first becomes available, a date that a bill is mailed to a borrower, a date that a bill is displayed on a Web site operated by or for the account servicer 102, etc. The step 204 may be implemented on or after the drop date.

During a step 206, the account servicer 102 receives an authorization directly or indirectly from the borrower to process the payment. In some embodiments, the authorization may be received in or as part of an email message, instant message communication, wireless signal, or other electronic signal or communication. Alternatively, in some embodiments, the borrower may provide the authorization by clicking on a link on a Web page, checking off a box displayed on a Web page, or providing other information via a Web page or Web site. For example, a borrower clicking on the "VIEW CURRENT/UPCOMING BILLS" link in the form or frame 154 may be shown a list of current and/or upcoming bills. The borrower may click on or otherwise select or indicate a specific bill to be paid which acts to provide the borrower's authorization to the account servicer 102. As another example, the borrower may check off a box next to one or more of the current and/or upcoming bills, such check being the borrower's authorization for the account servicer 102 to process payments for the indicated bills. In some embodiments, the account servicer 102 may provide to the borrower confirmation of receipt of authorization from the borrower to process the payment on the borrower's behalf.

During a step 208, the account servicer 102 receives information from the borrower necessary to process the payment identified during the step 202. In some embodiments, the step 208 may be combined with or be part of the step 206. In some embodiments, the account servicer 102 may provide to the borrower confirmation of receipt of the information received during the step 208.

The borrower may need to provide information such as the name, identifier (e.g., ABA number) and address of the borrower's bank, account or other financial institution from which the borrower will take the funds to make the payment, etc. in order to allow the account servicer 102 to process the payment on behalf of the borrower.

During a step 210, the account servicer 102 processes the payment identified during the step 202 on behalf of the borrower. The account servicer 102 may use some or all of the information received during the step 208 to process the payment. In some embodiments, the account servicer 102 may provide a notification or confirmation to the borrower that the payment has been made. In addition, the account servicer 102 may access or update a Web site, database or other electronically accessible resource to reflect payment. In some embodiments, an electronic payment from a borrower on the Web site may include a payment amount and distribution method (if more than required amount is paid) and a bank/ABA number from which to retrieve the funds. Once a payment is submitted electronically, the account servicer 102 or a master servicer may transfer the funds from the bank account specified to the account servicer's account (or a master servicer's account). When more than the required payment is specified, the remaining funds are allocated to the respective sub-accounts within the system. The Web site preserves the account information to simplify any future payments the borrower may submit on the Web site.

Figure 4:
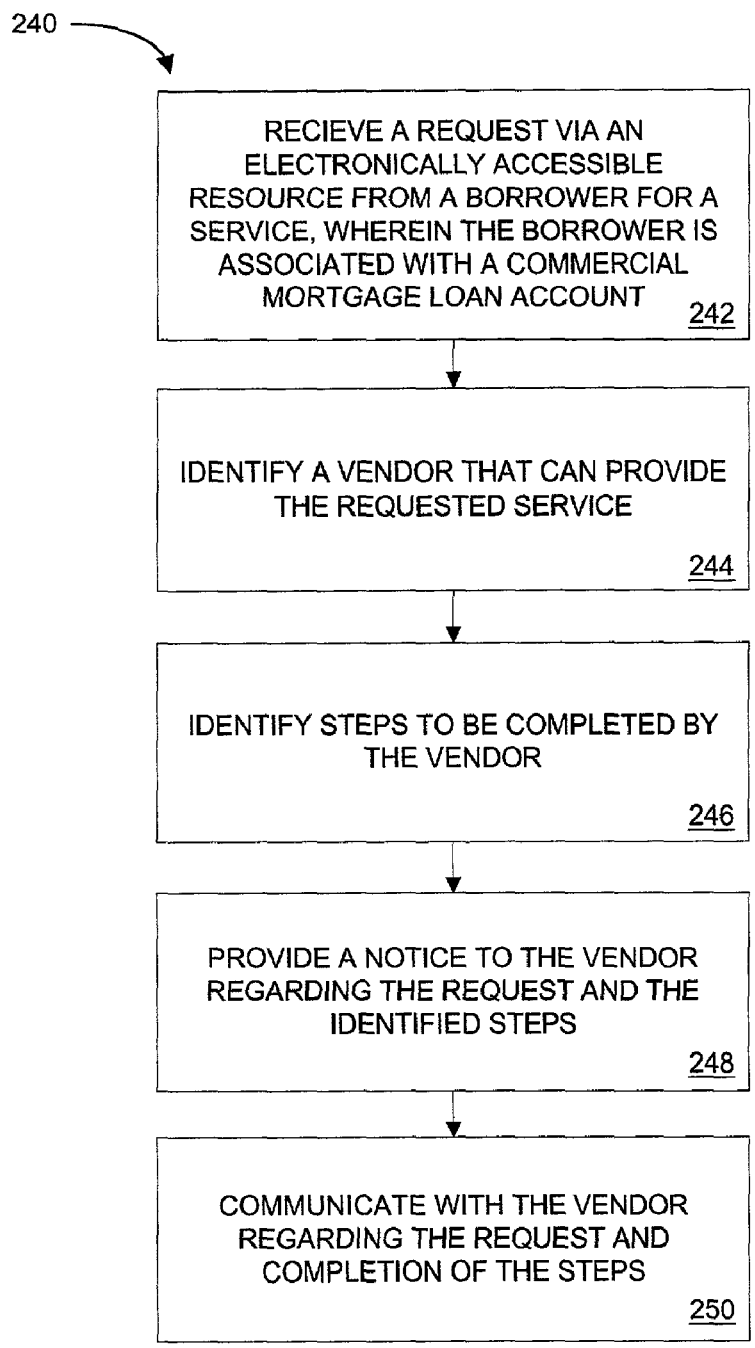
FIG. 4 is a flowchart of a second embodiment of a method usable with the system of FIG. 1.

Reference is now made to FIG. 4, where a flow chart 240 is shown which represents the operation of a second embodiment of the present invention. The particular arrangement of elements in the flow chart 240 is not meant to imply a fixed order to the steps; embodiments of the present invention can be practiced in any order that is practicable. In some embodiments, some or all of the steps of the method 240 may be performed or completed by the account servicer 102 or a server, user device and/or another device, as will be discussed in more detail below. In some embodiments, the method 240 may be implemented in conjunction with one or more other methods disclosed herein.

The method 240 is particularly useful for enabling the account servicer 102 to refer requests from borrowers for services to vendors that may be able to provide the requested services. Thus, the method 240 allows the account servicer 102 to provide a customer service benefit to borrowers associated with commercial mortgage loans.

Processing begins at a step 242 during which the account servicer 102 receives a request via an electronically accessible resource (e.g., Web site) directly or indirectly from a borrower for a service. The service may include or be any type of service of interest to a borrower, including, but not limited to, tax services, tax appeal services, property inspection services, accounting or legal services, etc. For example, a borrower may want to file a tax appeal when the borrower suspects that the taxes for the property should be less than what the borrower is asked to pay. Tax appeals are usually done at the request of the borrower. The process is time consuming, complex and requires specific documents to be filed with the taxing authorities. Most borrowers seek legal expertise from a tax attorney who is familiar with the tax authorities laws. Each county and tax authority have specific dates on which appeals are accepted. These dates are available on the (or other electronically accessible resource (e.g., Web site) and the electronically accessible resource also may provide or include a capability or utility to send emails reminders to borrowers as the appeal dates approach.

In some embodiments, the request may be received in or as part of an email message; instant message communication; HTML, FTP or XML transmission, or other electronic signal or communication. In some embodiments, an account servicer or other entity implementing the method 240 may operate, host, or implement a Web site, database or other electronically accessible resource at which the request can be received. For example, a borrower may access a Web site and post or otherwise provide a request regarding a commercial mortgage loan account via the Web site. As another example, the borrower might send an email message including the request to the Web site or to an email address associated with the Web site. The request received during the step 242 may include identifiers or other information regarding an account, property, borrower, etc. associated with the request.

During a step 244, the account servicer 102 identifies a vendor that can provide at least some of the requested service. The account servicer 102 or other entity or device implementing the method 240 may have, keep or access a database, log or list of potential vendors.

During a step 246, the account servicer 102 identifies at least one step that is to be completed by the vendor identified during the step 244 regarding the request received during the step 242. The steps may be or include actions to be taken by the vendor in providing the service, communicating with the requestor of the service, etc. For example, the account servicer 102 implementing the method 240 may want the vendor to contact the requestor by a certain date, provide the requested service by a certain date, provide an estimate for the service by a certain date, confirm contract with the requestor by a certain date, update the entity as to the status of the service at one or more later dates and times, provide a description of the vendor's response to the service request, etc. In some embodiments, the account servicer 102 may require that the vendor notify the entity after an initiation or completion of one or more steps, as will be discussed in more detail below.

In a more specific example, the account servicer 102 or other entity implementing the step 240 may receive an email message from a borrower requesting help with a tax appeal. A tax appeal for the borrower may involve requesting an appeal on one or more specific properties and providing data and documentation as requested by tax appeal attorneys. The account servicer 102 may forward to the request to a vendor (e.g., law firm, accounting firm) that provides tax appeal services. The account servicer 102 may itself complete the following steps, or request that the vendor complete the following steps: make contact with the borrower regarding the appeal, determine the likelihood for a successful (e.g., tax minimizing) appeal, submit the tax appeal to the appropriate tax authorities, request or establish a hearing date, provide the account servicer 102 with a referral fee, provide information regarding the result of the appeal to the borrower, account servicer 102 or other party, etc.

During a step 248, the account servicer 102 provides a message or other notification to the vendor identified during the step 244 regarding the request received during the step 242 and/or the steps determined during the step 246. In some embodiments, the notification may be provided in or as part of an email message; instant message communication; HTML, FTP or XML transmission, or other electronic signal or communication. In addition, in some embodiments, the notification may inquiry a copy of the request, an identifier associated with the request, an identifier associated with the requester, a time/date stamp for the request and/or the notification, an identifier associated with the vendor, contact information (e.g., name, telephone number, email address) for the requestor, the properties involved in the appeal and any comments, etc. These facts often carry forward throughout the life of the appeal request along with any comments placed by the account servicer 102 or vendor along the way. The account servicer 102 may make such comments available via an electronically accessible resource.

During a step 250, the account servicer 102 communicates with the vendor regarding the requested service and the steps. The step 250 may have a variety of implementations. For example, if a step is not completed by a designated date and/or time, the entity may send a further notification to the vendor reminding the vendor of the step and the date/time, requesting an update from the vendor, etc. As another example, the vendor may send a message to the entity to update the entity as to the status of one or more of the steps, to update the entity as to the completion of one or more of the steps, to update the entity as to any estimate or proposal provided by the vendor to the service requester, etc. In a further example, the identity may communicate with the service requestor regarding timeliness and/or quality of performance of the requested service by the vendor and provide feedback to the vendor until the requested service is completed.

In some embodiments, the method 240 may include the account servicer 102 receiving a fee for referring the borrower to the vendor. The account servicer 102 may prepare and provide an invoice to the vendor when the notification is sent during the step 248, when the service is started or completed, or at some other point. In some embodiments, the account servicer 102 may bill the borrower for the service, collect payment from the borrower for the service, and/or provide payment to the vendor.

Figure 5:
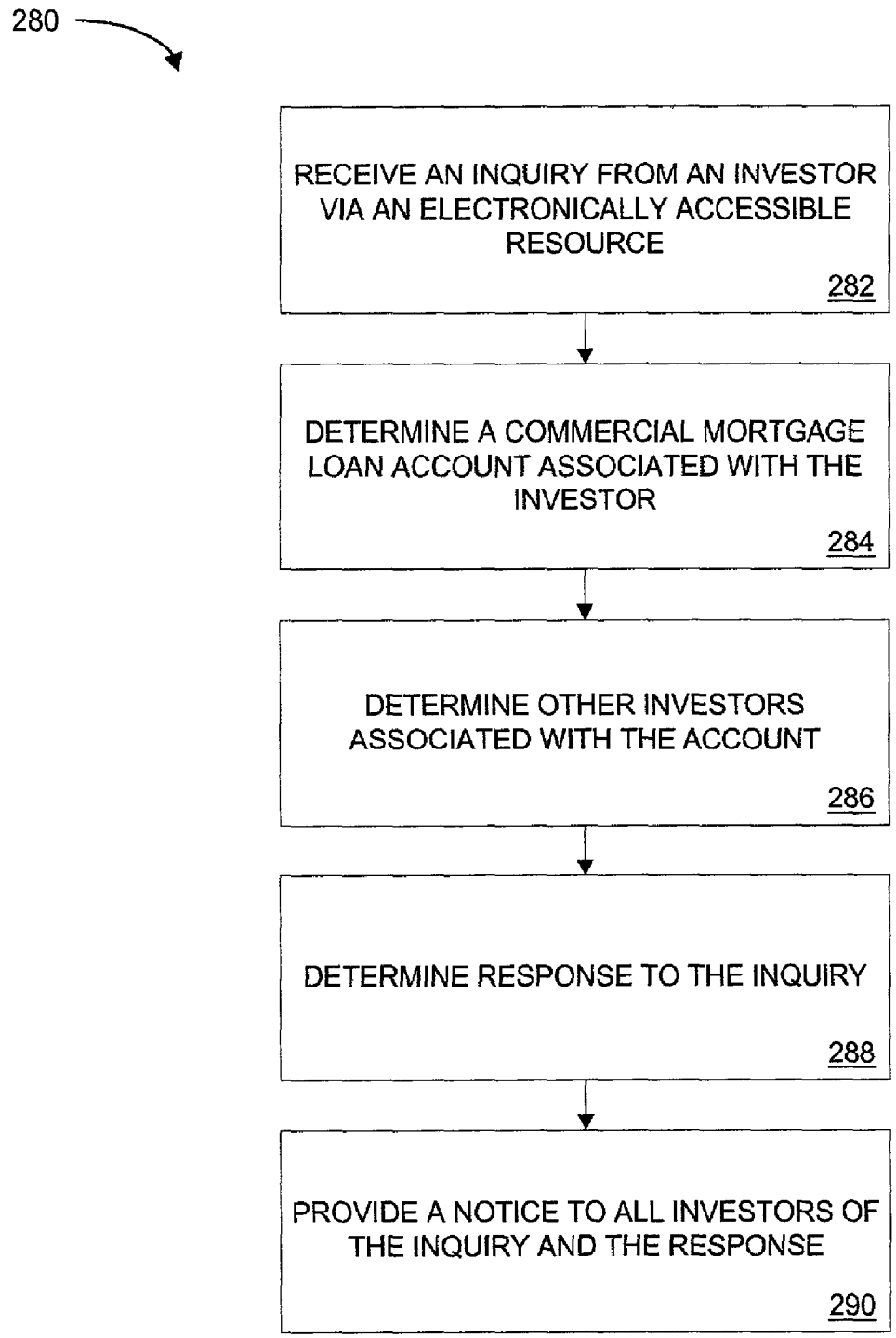
FIG. 5 is a flowchart of a third embodiment of a method in usable with the system of FIG. 1.

Reference is now made to FIG. 5, where a flow chart 280 is shown which represents the operation of a third embodiment of the present invention. The particular arrangement of elements in the flow chart 280 is not meant to imply a fixed order to the steps; embodiments of the present invention can be practiced in any order that is practicable. In some embodiments, some or all of the steps of the method 280 may be performed or completed by the account servicer 102 or a server, user device and/or another device, as will be discussed in more detail below. In some embodiments, the method 280 may be implemented in conjunction with one or more other methods disclosed herein.

The method 280 is particularly useful for responding to an inquiry received from an investor and providing the response to all investors associated with a particular account. In some embodiments of the method 280, trustees may be considered as investors.

Processing begins at a step 282 during which the account servicer 102 receives an inquiry directly or indirectly from an investor or other party regarding a commercial mortgage loan account. In some embodiments, the inquiry may be received in or as part of an email message; instant message communication; HTML, FTP or XML transmission, or other electronic signal or communication. In some embodiments, the account servicer 102 may operate, host, or implement a Web site, database or other electronically accessible resource at which the inquiry can be received. For example, an investor may access a Web site and post or otherwise provide a question regarding a commercial mortgage loan account via the Web site. As another example, the investor might send an email message including the inquiry to the Web site or to an email address associated with the Web site. The inquiry received during the step 282 may include identifiers or other information regarding an account, investor, property, etc. associated with the inquiry.

An inquiry may be directed to just about any aspect of an account. For example, an inquiry may request information regarding the status of an account, the status of a reserve fund or escrow account associated with an account, the status of a property inspection associated with an account, the status of a borrower payment, expected bills or payments associated with an account, current delinquency, etc.

During a step 284, the account servicer 102 determines an account associated with the investor. Such a determination may be made by querying an account database and/or an investor database that relates investors to accounts, or vice versa. For example, the inquiry received during the step 282 may include a code or other identifier associated with the investor making the inquiry. An investor database may include information regarding investors and accounts associated with the investors. In some cases, an investor may be associated with more than one account. In such cases, the inquiry may need to contain an identifier or other information identifying the particular account to which the inquiry relates. Alternatively, a message can be sent back to the investor asking the investor to identify the account to which the inquiry relates.

During a step 286, the account servicer 102 determines at least one other investor that is associated with the account identified during the step 284. Some regulatory schemes or servicing agreements for commercial mortgage loans or commercial mortgage backed securities require all investors be notified of any inquiry to an account and/or any response created in response to the inquiry. In some embodiments, the step 286 may be completed by accessing an account database or list that indicates all investors associated with an account. Alternatively, a trustee associated with the account may first be determined and then queried to ascertain other investor associated with an account.

During a step 288, the account servicer creates or otherwise determines a response to the inquiry received during the step 282. In some embodiments, the step 288 may occur prior to or simultaneously with either or both of the steps 284 and 286. The response may be generated automatically or via human intervention or involvement.

During a step 290, the response determined during the step 288 is provided to all of the investors identified during the step 286 and the investor from whom the inquiry was received. In some embodiments, the response may be sent in or as part of an email message; instant message communication; HTML, FTP or XML transmission, or other electronic signal or communication. In addition, in some embodiments, the response may include a copy of the inquiry, a copy of the response, an identifier associated with the inquiry, an identifier associated with the investor, a time/date stamp for the inquiry and/or response, an identifier associated with the response, contact information for further information, etc.

In some embodiments, the response sent during the step 290 may include data (e.g., link, URL) indicative of a location (e.g., database, Web site or Web page) where information regarding the account, inquiry and/or response can be found or retrieved. Thus, the response may or may not include information directly responding to the inquiry received during the step 282 but may include the data needed to access the information at or retrieve the information from a Web site, database, or other electronically accessible resource. The data may include a hyperlink, password, etc. This process allows information regarding the inquiry and/or the response to be provided to investors in a more secure fashion since the information is not sent in bulk or via a broadcasted communication.

Account Servicer Device

Figure 6:
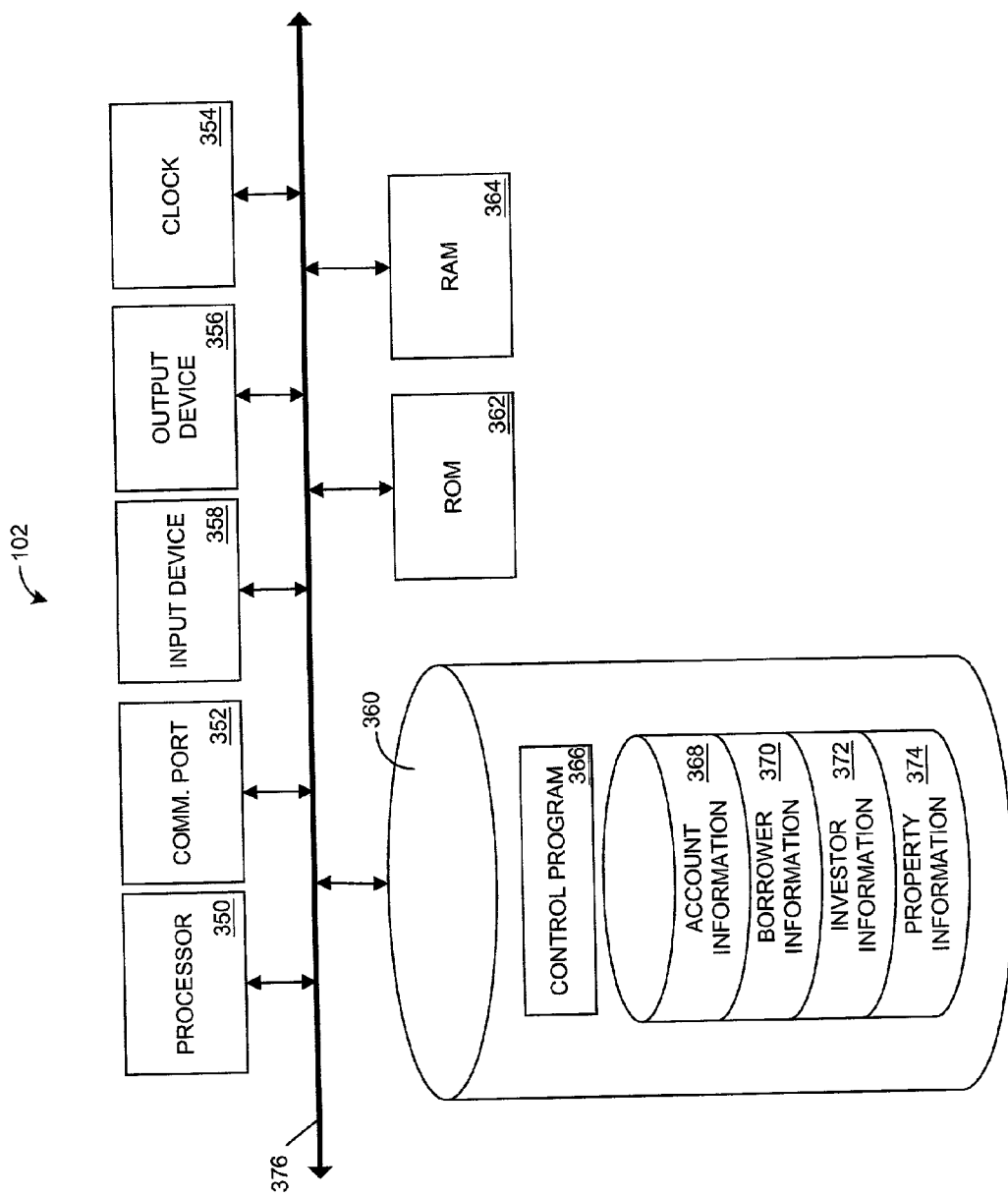
FIG. 6 is a block diagram of components for an embodiment of an account servicer of Figure.

Now referring to FIG. 6, a representative block diagram of a configuration for a device 340 used by the account servicer 102 is illustrated. The device 340 may include a processor, microchip, central processing unit, or computer 350 that is in communication with or otherwise uses or includes one or more communication ports 352 for communicating with other devices. Communication ports may include such things as local area network adapters, wireless communication devices, Bluetooth technology, etc. The device 340 also may include an internal clock element 354 to maintain an accurate time and date for the device 340, create time stamps for communications received or sent by the device 340, etc.

If desired, the device 340 may include one or more output devices 356 such as a printer, infrared or other transmitter, antenna, audio speaker, display screen or monitor, text to speech converter, etc., as well as one or more input devices 358 such as a bar code reader or other optical scanner, infrared or other receiver, antenna, magnetic stripe reader, image scanner, roller ball, touch pad, joystick, touch screen, microphone, computer keyboard, computer mouse, etc.

In addition to the above, the device 340 may include a memory or data storage device 360 to store information, software, databases, communications, device drivers, reports, inquiries, service requests, etc. The memory or data storage device 360 preferably comprises an appropriate combination of magnetic, optical and/or semiconductor memory, and may include, for example, Random Read-Only Memory (ROM), Random Access Memory (RAM), a tape drive, flash memory, a floppy disk drive, a Zip™ disk drive, a compact disc and/or a hard disk. The device 340 also may include separate ROM 362 and RAM 364.

The processor 350 and the data storage device 360 in the device 340 each may be, for example: (i) located entirely within a single computer or other computing device; or (ii) connected to each other by a remote communication medium, such as a serial port cable, telephone line or radio frequency transceiver. In one embodiment, the device 340 may include or comprise one or more computers that are connected to a remote server computer for maintaining databases.

A conventional personal computer or workstation with sufficient memory and processing capability may be used as the device 340. In some embodiments, the device 340 may provide, host, operate or implement an electronically accessible resource. For example, the device 340 may operate as or include a Web site or database server for an Internet environment. The Web site or database may be accessible to borrowers and investors. The device 340 preferably is capable of high volume transaction processing, performing a significant number of mathematical calculations in processing communications and database searches. A Pentium™ microprocessor such as the Pentium IV™ microprocessor, manufactured by Intel Corporation may be used for the processor 350. Equivalent processors are available from Motorola, Inc., AMD, or Sun Microsystems, Inc. The processor 350 also may comprise one or more microprocessors, computers, computer systems, etc.

Software may be resident and operating or operational on the device 340. The software may be stored on the data storage device 360 and may include a control program 366 for operating the device 340, databases, etc. The control program 366 may control the processor 350. The processor 350 preferably performs instructions of the control program 366, and thereby operates in accordance with the present invention, and particularly in accordance with the methods described in detail herein. The control program 366 may be stored in a compressed, uncompiled and/or encrypted format. The control program 366 furthermore includes program elements that may be necessary, such as an operating system, a database management system and device drivers for allowing the processor 350 to interface with peripheral devices, databases, etc. Appropriate program elements are known to those skilled in the art, and need not be described in detail herein.

The device 340 also may include or store information regarding accounts, borrowers, investors, vendors, trustees, properties, mortgages, agreements, documents, communications, etc. For example, information regarding one or more accounts may be stored in an account information database 368 for use by the device 340 or another device or entity. Information regarding one or more borrowers may be stored in a borrower information database 370 for use by the device 340 or another device or entity, information regarding one or more investors may be stored in an investor information database for use by the device 340 or another device or entity, and information regarding one or more properties may be stored in a property information database 374 for use by the device 340 or another device or entity. In some embodiments, some or all of one or more of the databases may be stored or mirrored remotely from the device 340.

According to an embodiment of the present invention, the instructions of the control program may be read into a main memory from another computer-readable medium, such as from the ROM 362 to the RAM 364. Execution of sequences of the instructions in the control program causes the processor 350 to perform the process steps described herein. In alternative embodiments, hard-wired circuitry may be used in place of, or in combination with, software instructions for implementation of some or all of the methods of the present invention. Thus, embodiments of the present invention are not limited to any specific combination of hardware and software.

The processor 350, communication port 352, clock 354, output device 356, input device 358, data storage device 360, ROM 362, and RAM 364 may communicate or be connected directly or indirectly in a variety of ways. For example, the processor 350, communication port 352, clock 354, output device 356, input device 358, data storage device 360, ROM 362, and RAM 364 may be connected via a bus 376.

While specific implementations and hardware configurations for the device 102 has been illustrated, it should be noted that other implementations and hardware configurations are possible and that no specific implementation or hardware configuration is needed. Thus, not all of the components illustrated in FIG. 6 may be needed for a device implementing the methods disclosed herein. Therefore, many different types of implementations or hardware configurations can be used in the system 100 and the methods disclosed herein are not limited to any specific hardware configuration.

Databases

As previously discussed above, in some embodiments an account servicer or other device or entity may include or access an account information database for storing or keeping information regarding one or more commercial mortgage loan accounts. One representative account information database 400 is illustrated in FIG. 7.

The account information database 400 may include an account identifier field 402 that may include codes or other identifiers for one or more accounts, an associated property identifier field 404 that may include codes or other identifiers for one or more properties associated with the accounts identified in the field 402, an associated borrower identifier field 406 that may include codes or other identifiers for one or more borrowers associated with the accounts identified in the field 402, an associated investors field 408 that may include codes or other identifiers for one or more investors associated with the accounts identified in the field 402, a current account balance field 410 that may include information regarding the current balances of the borrowers identified in the field 406 for the accounts identified in the field 402, a next payment due field 412 that may include information regarding payments due from the borrowers identified in the field 406, and a reserve amount field 414 that may include information regarding reserve or escrow amounts kept by the account servicer on behalf of the borrowers identified in the field 406 for the accounts identified in the field 402.

In some embodiments, an account may be associated with more than one borrower, more than one property, and/or more than one investor. Similarly, a borrower may be associated with more than one account, more than one property, and/or more than one investor and an investor may be associated with more than one account, more than one property, and/or more than one borrower.

Other or different fields also may be used in the account information database 400. For example, in some embodiments an account information database may include information regarding recipients of payments; contact information (e.g., postal addresses, email addresses, telephone numbers, names) for borrowers, investors or payment recipients; account history, transactions associated with the accounts identified in the field 402; insurance associated with the accounts identified in the field 402; taxes or tax identification numbers associated with the accounts identified in the field 402 or related parties; mortgage or account origination information for the accounts identified in the field 402; bills associated with the accounts identified in the field 402; agreements or other documents associated with the accounts identified in the field 402; reports available (e.g., supplemental, property or periodic reports, property inspection reports) for the accounts identified in the field 402; automatic payments established for the accounts identified in the field 402; tax appeals associated with the accounts identified in the field 402; terms and conditions associated with the accounts identified in the field 402; reserve draw requests made by the borrowers identified in the field 406 for the accounts identified in the field 402; inquiries made by the investors identified in the field 408 for the accounts identified in the field 402; vendors, agents, attorneys, inspectors, servicers, etc. associated with the accounts identified in the field 402; interest rate or other payment terms associated with the accounts identified in the field 402; etc.

As illustrated by the account information database 400 of FIG. 7, the account identified as "A-1256" in the field 402 is associated with the property identified as "P-82378", the borrower identified as "B-815391" and the investors identified as "I-39105", "I-40028" and "I-80191". The account identified as "A-1256" has a current mortgage balance of twenty-eight million dollars and a reserve balance of two and one-half million dollars. The borrower identified as "B-815391" has a payment to make of three hundred thousand dollars by Feb. 25, 2002.

As previously discussed above, in some embodiments an account servicer or other entity or device may include or access a borrower information database for storing or keeping information regarding one or more borrowers. One representative borrower information database 500 is illustrated in FIG. 8.

The borrower information database 500 may include a borrower identifier field 502 that may include codes or other identifiers for one or more borrowers, a borrower name field 504 that may include name or other descriptive information regarding the borrowers identified in the field 502, a login/password field 506 that may include login, password or other security or access information associated with the borrowers identified in the field 502, and an account identifiers field 508 that may include codes or other identifiers for one or more accounts associated with the borrowers identified in the field 502.

Other or different fields also may be used in the borrower information database 500. For example, in some embodiments a borrower information database may include contact or address information for the borrowers identified in the field 502, financial account information (e.g., bank names, ABA numbers) for the borrowers identified in the field 502, information-regarding service requests made by the borrowers identified in the field 502, etc.

As illustrated by the borrower information database 500 of FIG. 8, the borrower identified as "B-451859" in the field 502 is named "BIGCO PROPERTY DEVELOPERS" and is associated with the account identified as "A-6481". The borrower identified as "B-451859" has a login of "BPD" and a password of "AXF149011".

As previously discussed above, in some embodiments an account servicer or other entity or device may include or access an investor information database for storing or keeping information regarding one or more investors. One representative investor information database 600 is illustrated in FIG. 9.

The investor information database 600 may include an investor identifier field 602 that may include codes or other identifiers for one or more investors, an investor name field 604 that may include name or other descriptive information regarding the investors identified in the field 602, a login/password field 606 that may include login, password or other security or access information associated with the investors identified in the field 602, and an account identifiers field 608 that may include codes or other identifiers for one or more accounts associated with the investors identified in the field 602.

Other or different fields also may be used in the investor information database 600. For example, in some embodiments a borrower information database may include contact (e.g., names, email addresses, postal addresses, telephone numbers) or address information for the investors identified in the field 602, financial account information (e.g., bank names, ABA numbers) for the investors identified in the field 602, information regarding inquiries made by the investors identified in the field 602, information regarding responses to inquiries, etc.

Figure 9:
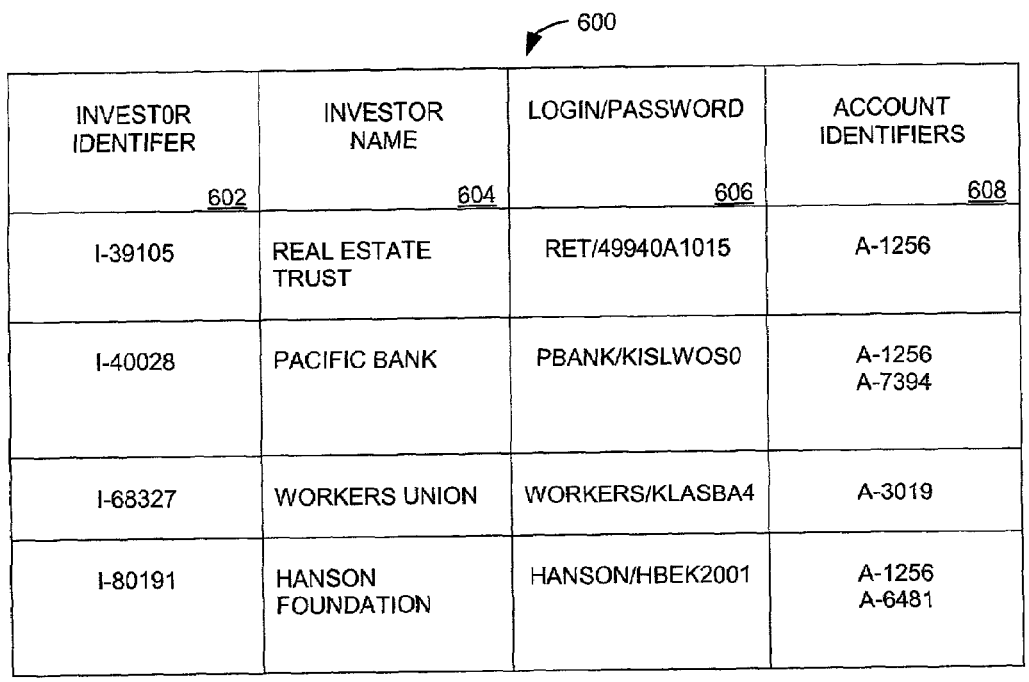
FIG. 9 is an illustration of a representative investor information database of FIG. 6.

As illustrated by the investor information database 600 of FIG. 9, the investor identified as "I-39105" in the field 602 is named "REAL ESTATE TRUST" and is associated with the account identified as "A-1256". The investor identified as "I-39105" has a login of "RET" and a password of "HBA101501".

As previously discussed above, in some embodiments an account servicer or other entity or device may include or access a property information database for storing or keeping information regarding one or more properties. One representative property information database 700 is illustrated in FIG. 10.

The property information database 700 may include a property identifier field 702 that may include codes or other identifiers for one or more properties, a property description field that may include name, location or other descriptive information for the properties identified in the field 702, and an associated account identifier field 706 that may include codes or other identifiers for accounts associated with the properties identified in the field 702.

Other or different fields also may be used in the property information database 700. For example, in some embodiments a property information database may include information regarding property managers, developers, etc. associated with the properties identified in the field 702, information regarding inspections, inspection reports, inspection results, etc. associated with the properties identified in the field 702, information regarding deeds, titles or other legal documents associated with the properties identified in the field 702, transaction history of the properties identified in the field 702, etc.

Figure 10:
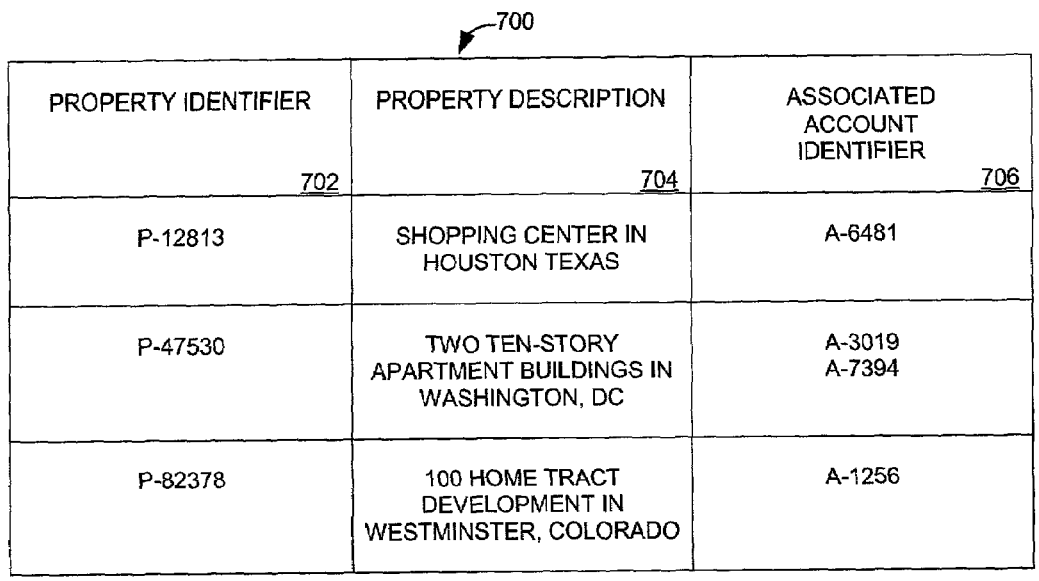
FIG. 10 is an illustration of a representative property information database of FIG. 6.

As illustrated by the property information database 700 of FIG. 10, the property identified as "P-12813" in the field 702 is a "SHOPPING CENTER IN HOUSTON TEXAS" as is associated with the account identified as "A-6481".

The methods of the present invention may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. In addition, many, if not all, of the steps for the methods described above are optional or can be combined or performed in one or more alternative orders or sequences without departing from the scope of the present invention and the claims should not be construed as being limited to any particular order or sequence, unless specifically indicated.

Each of the methods described above can be performed on a single computer, computer system, microprocessor, etc. In addition, two or more of the steps in each of the methods described above could be performed on two or more different computers, computer systems, microprocessors, etc., some or all of which may be locally or remotely configured. The methods can be implemented in any sort or implementation of computer software, program, sets of instructions, code, ASIC, or specially designed chips, logic gates, or other hardware structured to directly effect or implement such software, programs, sets of instructions or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

Although the present invention has been described with respect to various embodiments thereof, those skilled in the art will note that various substitutions may be made to those embodiments described herein without departing from the spirit and scope of the present invention.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

The embodiments of the invention in which an exclusive property or privilege is claimed are defined as follows:

1. A method for facilitating a service provider to refer requests from a borrower for services to a vendor, wherein the borrower has an account involving a commercial mortgage loan and ownership interest in the commercial mortgage loan is provided via at least one commercial mortgage backed security, the method comprising:

accessing, by a borrower, an electronically accessible resource that includes information regarding a commercial mortgage loan account, wherein the borrower has a loan account associated with the commercial mortgage loan and ownership interest in the commercial mortgage loan is provided via at least one commercial mortgage backed security;

receiving a request regarding said account via said electronically accessible resource from said borrower for a referral for a service, wherein said borrower is associated with said account;

identifying a vendor for providing said service;

identifying at least one step associated with said request, said at least one step is being accomplished by said vendor providing said service;

providing a notification via an electronic communication to said vendor regarding said request and said at least one step; and communicating with said vendor regarding said at least one step for accomplishing said at least one step.

2. The method of claim 1, wherein said at least one step includes at least one action to be taken by said vendor by a specific date.

3. The method of claim 1, wherein said communicating with said vendor regarding said at least one step includes providing a notification to said vendor indicative of a lack of a completion of said at least one step.

4. The method of claim 3, wherein said communicating with said vendor regarding said at least one step includes receiving an indication from said vendor of a completion of said at least one step.

5. The method of claim 1, wherein said at least one step includes a plurality of steps and said communicating with said vendor regarding said at least one step includes:

providing a notification to said vendor indicative of a lack of a completion of a first of said plurality of steps, receiving an indication from said vendor of a completion of said first of said plurality of steps;

providing a notification to said vendor indicative of a lack of a completion of a second of said plurality of steps; and receiving an indication from said vendor of a completion of said second of said plurality of steps.

6. The method of claim 1, wherein said notification provided to said vendor includes at least one of the following:

an identifier associated with said request;

an identifier associated with said borrower; and data indicative of a location where information regarding said borrower is located.

7. The method of claim 1, wherein said at least one step includes a plurality of steps and wherein said communicating with said vendor regarding said at least one step includes providing a notification to said vendor when one of said plurality of steps is not indicated by said vendor as being completed.

8. The method of claim 1, further comprising:

providing an invoice to said vendor when said service is provided to the borrower.

9. The method of claim 1, further comprising:

providing an invoice to said vendor when said at least one step is completed.

10. The method of claim 1, further comprising:

determining if said vendor has completed said at least one step.

11. The method of claim 1, further comprising:
providing a notification to said borrower regarding said vendor.

12. The method of claim 1, further comprising:
providing a notification to said borrower regarding said at least one step.

13. The method of claim 1, further comprising:
receiving a fee from said vendor.

14. The method of claim 1, wherein said electronic communication is an email message.

15. The method of claim 1, wherein said electronically accessible resource is a Web site.

16. The method of claim 1, wherein said receiving a request via said electronically accessible resource from said borrower for a service, wherein said borrower is associated with said account, includes receiving an email message at said electronically accessible resource from said investor, wherein said email message includes said request.

17. The method of claim 1, wherein said receiving a request via said electronically accessible resource from said borrower for a service, wherein said borrower is associated with said account, includes receiving said request during a use of said electronically accessible resource by said borrower.

18. A method for facilitating response to an inquiry from an investor regarding a commercial mortgage loan, comprising:
accessing, by an investor, an electronically accessible resource that includes information regarding a commercial mortgage loan, wherein ownership interest in the commercial mortgage loan is provided to at least one investor via at least one commercial mortgage backed security;
receiving an inquiry via said electronically accessible resource from said investor regarding said commercial mortgage loan;
determining at least one other investor associated with said commercial mortgage loan;
determining a response to said inquiry; and
providing said response to said investor and said at least one other investor.

19. The method of claim 18, wherein said electronically accessible resource includes a Web site.

20. The method of claim 19, wherein said providing said response to said investor and said at least one other investor includes providing data to said investor and said at least one other investor, said data being indicative of a location of said response.

21. The method of claim 18, wherein said providing said response to said investor and said at least one other investor includes allowing said investor and said at least one other investor to access said response via said electronically accessible resource.

22. The method of claim 18, wherein said providing said response to said investor and said at least one other investor includes providing an electronic communication to said investor and said at least one other investor that includes said response.

23. The method of claim 18, wherein said receiving an inquiry via said electronically accessible resource from said investor regarding said commercial mortgage loan includes receiving an email message at said electronically accessible resource from said investor, wherein said email message includes said inquiry.

24. The method of claim 18, wherein said receiving an inquiry via said electronically accessible resource from said investor regarding said commercial mortgage loan, includes receiving said inquiry during a use of said electronically accessible resource by said investor.

25. A system for facilitating a service provider to refer requests from a borrower for services to a vendor, the system comprising:
a memory;
a communication port; and
a processor connected to said memory and said communication port, said processor being operative to:
allow access, by a borrower, to an electronically accessible resource that includes information regarding commercial mortgage loan account, wherein the borrower has an account involving a commercial mortgage loan and ownership interest in the commercial mortgage loan is provided via at least one commercial mortgage backed security;
receive a request regarding said account via said electronically accessible resource from said borrower for a referral for a service, wherein said borrower is associated with said account;
identify a vendor for providing said service;
identify at least one step associated with said request, said at least one step being accomplished by said vendor for providing said service;
provide a notification via an electronic communication to said vendor regarding said request and said at least one step; and
communicate with said vendor regarding said at least one step to accomplish said at least one step.

26. A computer program product in a computer readable medium for facilitating a service provider to refer requests from a borrower for services to a vendor, the computer program comprising:
instructions for facilitating access, by a borrower, to an electronically accessible resource that includes information regarding a commercial mortgage loan account, wherein ownership interest in the commercial mortgage loan is provided via at least one commercial mortgage backed security;
instructions for obtaining a request regarding said account via said electronically accessible resource from said borrower for a referral for a service, wherein said borrower is associated with said account;
instructions for selecting a vendor for providing said service;
instructions for selecting at least one step associated with said request, said at least one step being accomplished by said vendor for providing said service;
instructions for sending a notification via an electronic communication to said vendor regarding said request and said at least one step; and
instructions for maintaining contact with said vendor regarding said at least one step to accomplish said at least one step.

27. A system for facilitating response to an inquiry from an investor regarding a commercial mortgage loan, comprising:
a memory;
a communication port; and
a processor connected to said memory and said communication port, said processor being operative to:
allow access, by an investor, to an electronically accessible resource that includes information regarding a commercial mortgage loan, wherein ownership interest in the commercial mortgage loan is provided to at least one investor via at least one commercial mortgage backed security;
receive an inquiry via said electronically accessible resource from said investor regarding said commercial mortgage loan;

determine at least one other investor associated with said commercial mortgage loan;

determine a response to said inquiry; and provide said response to said investor and said at least one other investor.

28. A computer program product in a computer readable medium for facilitating response to an inquiry from an investor regarding a commercial mortgage loan, comprising:

instructions for facilitating access by an investor to an electronically accessible resource that includes information regarding a commercial mortgage loan, wherein ownership interest in the commercial mortgage loan is provided to at least one investor via at least one commercial mortgage backed security;

instructions for obtaining an inquiry via said electronically accessible resource from said investor regarding said commercial mortgage loan;

instructions for identifying at least one other investor associated with said commercial mortgage loan;

instructions for identifying a response to said inquiry; and instructions for sending said response to said investor and said at least one other investor.

* * * * *